(12) United States Patent
Ferrelli (10) Patent No.: US 10,473,440 B1
(45) Date of Patent: Nov. 12, 2019

(54) SYSTEM FOR PERSONALIZED BERM

(71) Applicant: Michael Ferrelli, Chester, NH (US)

(72) Inventor: Michael Ferrelli, Chester, NH (US)

( * ) Notice: Subject to any disclaimer, the term of this patent is extended or adjusted under 35 U.S.C. 154(b) by 0 days.

(21) Appl. No.: 16/169,288

(22) Filed: Oct. 24, 2018

(51) Int. Cl.
    *F41J 13/02* (2009.01)
    *B32B 3/06* (2006.01)
    *B32B 9/00* (2006.01)

(52) U.S. Cl.
    CPC .......... *F41J 13/02* (2013.01); *B32B 3/06* (2013.01); *B32B 9/005* (2013.01)

(58) Field of Classification Search
    CPC ........................................................ F41J 13/00
    See application file for complete search history.

(56) References Cited

U.S. PATENT DOCUMENTS

| | | | | |
|---|---|---|---|---|
| 4,819,946 | A * | 4/1989 | Kahler | F41J 13/00 273/404 |
| 6,722,195 | B2 * | 4/2004 | Duke | F41J 13/00 273/410 |
| 2011/0233870 | A1 * | 9/2011 | Oh | F41J 13/00 273/410 |
| 2015/0276357 | A1 * | 10/2015 | Peterson | F41J 3/0004 273/408 |
| 2016/0003584 | A1 * | 1/2016 | Durynski | F41J 13/02 273/410 |
| 2016/0116260 | A1 * | 4/2016 | Oh | F41J 13/00 273/410 |

\* cited by examiner

*Primary Examiner* — Eugene L Kim
*Assistant Examiner* — Christopher Glenn
(74) *Attorney, Agent, or Firm* — Sarita L. Pickett (57) ABSTRACT

A personalized modular backstop capable of suiting an individuals' needs. The modular backstop has blocks with a front and back wall of modified expanded polystyrene (EPS) foam connected by interior webbing. Top, bottom, and side panels work with the blocks to define an interior space having a composite material which works to trap projectiles and create a safe environment for firearms training.

8 Claims, 14 Drawing Sheets

SYSTEM FOR PERSONALIZED BERM

BACKGROUND OF THE INVENTION

1. Field of the Invention

The present invention relates generally to firearm berms. Particularly, the present invention relates to berms, baffles, and backstops for firearms. More particularly, the present invention relates to berms, baffles, and backstops for a variety of firearms of various fire power.

2. Description of the Prior Art

Bullet screens and traps used on firing ranges are well-known in the art. Berms, baffles, backstops, bullet screens, and traps are all variations upon a theme related to firearms.

US Patent Publication No. 20020121741 (2002, Malone) titled "Durable System For Controlling The Disposition Of Expended Munitions Fired At A Target Positioned Close To The Shooter" discloses in a shooting range for training personnel in the use of firearms, a bullet trap that prevents rebounding bullets or flying debris from injuring shooters, has a central section of stacked cylindrical logs, or logs having a trapezoidal cross section, supported by stacked rectangular supporting blocks on each side. The stacked cylindrical logs have conical end sections at the end facing the shooter. These conical end sections direct incoming bullets to passageways between the cylindrical logs. Bullets passing through these passageways then strike a backstop panel. In a preferred embodiment, both the cylindrical logs and the backstop panel are made of shock-absorbing foamed fiber-reinforced concrete.

U.S. Pat. No. 5,618,044 (1997, Bateman) discloses a Bullet Trap and Containment Cavity which can be assembled as a modular system, requires very little space for installation on a typical shooting range, and which stops impacting projectiles by an initial, generally perpendicular impact on a steel plate and then utilizes auxiliary impact surfaces to contain the resultant splatter zone projected from the initial point of contact.

US Patent Publication No. 2016/0003584 A1 (2016, Durynski et al.) discloses a portable bullet trap includes a trailer having a hitch. A bullet trap box is removably placed on the trailer. The bullet trap box is formed by a pair of spaced side walls interconnected by a back wall and having a front face. A bottom wall is below the side walls and the front face and back wall. A top wall is hinged to the back wall and is movable from a closed position covering the interior of the box and to an open position exposing the interior of the box. Baffles made from energy absorbing material, such as rubber, are detachably mounted within the box.

U.S. Pat. No. 5,405,673 (1995, Siebert) discloses a backstop for firearm projectiles includes a body of an ionomeric polymer disposed so as to slow and stop projectiles. The body of ionomeric material may comprise a plurality of spaced-apart sheets.

SUMMARY OF THE INVENTION

Disadvantages of the Prior Art Identified by the Inventor

The prior art, as described above, has not proven fully satisfactory for several reasons as alternatives are not readily available, most modules are heavy at 100 Lbs+ and are also inordinately expensive. These failings of the prior art which are addressed by the present inventive systems will now be discussed in greater detail.

For example, in U.S. Pat. No. 4,821,620, to Cartee et al. (1989), it is described to provide a screen of rubber-like material followed by a deflector plate. The bullet is said to travel through the screen and be diverted by the plate down toward the collector bin at the base of the device. The close proximity of the rubber-like material to the plate, combined with the angle at which the plate is disposed, produce the particular disadvantage of exposing the rubber-like material to relatively high-energy reflections of the bullet off the plate, therefore causing the material to quickly wear out and/or to allow bullets to escape back through the screen with enough energy to cause harm to persons or property.

Others including Baravaglio in U.S. Pat. No. 4,512,585 (1985), and Pencyla in U.S. Pat. No. 3,737,165 (1973), and Nikoden in U.S. Pat. No. 2,772,092 (1954), describe systems consisting of a collection of impact plates oriented at angles to the trajectory of the bullet which direct the bullet, relatively intact, backward or downward into an area where it is decelerated in some sort of generally rounded chamber. The curved plates, the number of plates and the need for a variety of other fabricated components make these devices generally expensive to manufacture, assemble, and service. Additionally, these devices generally suffer the disadvantage that bullet accumulations in the collection bins are not easily accessible to the user to facilitate removal of the lead.

Others including Wagoner in U.S. Pat. No. 4,126,311 (1978), and Coburn in U.S. Pat. No. 5,070,763 (1991), and U.S. patent application Ser. No. 08/204,682 (Bateman), have more effectively dealt with the problem of lead removal by describing long, generally funnel-shaped openings which direct projectiles through a relatively small aperture where they enter a containment chamber and are decelerated by one method or another. All these and similar devices require large quantities of plate material in order to form the relatively low angles required to guide the bullet into the chamber without destroying its integrity. The depth of such traps often must range from 15' to 40' in order to obtain a typically required vertical front opening of 8' to 10'. The cost of the plate required creates an obvious disadvantage to suppliers competing to produce such apparatus. Furthermore, the amount of space required for the bullet trap is a disadvantage in instances where the cost of land or surrounding facilities should be minimized or in instances where an existing shooting range only has a limited amount of space in which to place the trap.

Another problem yet unsolved by the prior art is containment of fine fragments and particulate matter created on impact without the problems associated with "deep" bullet traps or other complex or expensive arrangements. For example, Wojcinski in U.S. Pat. No. 5,171,020 (1992), describes a device consisting of a back plate and an elastic facing which form a containment chamber which is then filled with a mass of granulated rubber material. In theory, as the bullet passes through the granulated material, its velocity is slowed completely, or significantly enough that any impact with the back plate will not cause damage to the plate or the projectile. While this device appears to solve the containment problem, it can only do so at great cost.

Specifically, the volume of granulated material needed in practice tends to be unmanageable. And once the elastic facing becomes destroyed, it must be replaced or repaired. In order to perform this maintenance, all the granulated material must be removed, stored, and then replaced which procedure can be time consuming, expensive, and potentially even dangerous.

The generally acknowledged purpose of backstops, baffle berms and baffles is to protect against the injury of people, damage to property or both, when a full Surface Danger Zone (SDZ) cannot be provided. Erecting baffle berms and backstops are a necessary and a minimum requirement for range owners/operators who do not control 1.5 miles downrange for pistol or 3.5 miles downrange (typical for full SDZ) for high powered rifle, with appropriate 5 degree left and right safety zones. For these reasons, full SDZ ranges are generally considered the exception rather than the rule and are becoming a concept of the past.

A secondary benefit of backstops, baffle berms and baffles is to permit the periodic recovery of lead projectiles. For a range facility, lead projectiles are a recyclable metal resource that can contribute to the positive cash flow of the facility. For a personal owner, lead projectiles are a recoverable hazard that can be removed from the personal environment. Regardless of the owner then, projectile/bullet containment is a major consideration. It is the ultimate responsibility of the range owners/operators to ensure that the projectiles fired on their range are contained within the range property boundaries. While it is entirely possible for an existing range facility to be grandfathered against noise complaints, it is totally unlikely that any governmental body would make the same concession concerning safety. Therefore, it is paramount that shooting range owners/operators continually evaluate the shooting activities permitted and the requirements necessary to ensure those activities can be conducted with projectile/bullet containment within the property as the result. The level of requirement necessary for the projectile/bullet containment on the property of a shooting range facility will dictate the extent of the baffle construction.

It is an object of the present invention to provide a system and method for personalizing berms, baffles, and backstops according to the needs of a specific user. Specifically, the present system provides a system and method for berms which shall always stop the bullets; manage the bullets; and manage each bullet's flight characteristic so it remains on the property.

General Overview of the Present Invention

The present invention provides a personalizable berm for firearms training by providing modular shooting backstop for firearms. The system seeks to provide lead mitigation—stops bullets and bullet fragments from contaminating soil by functioning to contain the bullet or fragments within a box. The center of the box is filled with sand, and the surface area and the density of the sand stops the projectile.

When shooting at steel plates, misses are common as the target is normally less than 10" across. The present invention allows for a safe shooting environment as missed rounds would be safely captured. As a target backer the same principles as above apply. The structure itself is made up of four separate wall sections that connect to each other vertically. The front and back of these sections are connected to each other utilizing a plastic webbing system that can be broken down for easy setup and disassembly. Since the product is built utilizing sections, replacements sections can be provided for areas that have deteriorated from over use in a single area.

This wall catches bullets and keeps the objects like tree's, squirrels, and birds safe from getting hit when used. It holds 12" of sand vertically at a height of four feet by four feet wide. This provides you with a large safety backdrop to aim at your target, with little fear of missing. The small size allows you to place it on the edge of your shooting area. The external structure handles hundreds of rounds in a target area before breaking down but does not lose its functionality. The exterior design of the wall holds the sand in an upright position, giving the user an area to shoot at without needing a giant pile of sand that is unwieldy and difficult to maintain.

Comparing again to the prior art, with plywood, after a few shoots, the wood would break down and splinter allowing the internal fill to spill out. Contrary to this, the present invention structure minimizes leakage when the front face is opened up from excessive usage. Furthermore, the modular nature ensures that the device can be easily repaired with a repair kit, or swapping the damaged panel with a new one.

This was developed as a way to provide a safe shooting spot in personal yards that would not take up a lot of room or take away from backyard landscaping. Shooting at a pile of logs is not the safest thing to do, and other people actually use standing trees as back stops to their targets without a care of what's beyond them.

The invention captures and stops small arms fire and provides a safe back stop. This also replaces large expensive steel bullet traps that are currently on the market. Since the substrate is contained within the structure the bullet is stopped.

It is another object of the present invention to provide a personalizable modular backstop capable of suiting an individuals' needs. The modular backstop has blocks with a front and back wall of modified expanded polystyrene (EPS) foam connected by interior webbing. Top, bottom, and side panels work with the blocks to define an interior space having a composite material which works to trap projectiles and create a safe environment for firearms training.

It is a further object of the present invention to provide systems and methods of use for personalized berms, baffles, and backstops. In one embodiment, the present invention is a personalized backstop made of a modular system capable of reversible construction. The modular system has a few blocks, each of the blocks has a front wall and a back wall which are interconnected by interior webbing, defining a space between the front wall and the back wall. Each block has a bunch of vertical interlocking connectors. The vertical interlocking connectors of a first block are capable of reversibly interlocking with the vertical interlocking connectors of a second vertically adjacent block. This backstop has at least two side walls on either side of the backstop, thereby sandwiching the blocks between them. These sidewalls define the horizontal boundaries of the space between the front walls and the back walls of the blocks. This backstop also has a top panel and a bottom. The blocks are sandwiched between the top panel and the bottom. Just as the side walls define the horizontal boundaries of the substrate space, the top panel and the bottom of the backstop define vertical boundaries of the substrate space. The substrate space is filled with a composite material.

The personalized backstop can have at least three columns and/or at least three rows. In one embodiment, the blocks in each column are congruent with one another, and the blocks in each row are congruent with one another. In one embodiment, the columns are aligned vertically congruent and adjacent one another. In another embodiment, the columns are aligned vertically incongruent and yet adjacent one another, such that a first column is slanted with respect to an adjacent second column, and the second column is slanted with respect to an adjacent third column.

In one embodiment, a front wall of a block is connected reversibly by the interior webbing to a back wall of the block. In this case, the front wall is removable and replaceable by a second replacement front wall. The same interior webbing can then be used to reversibly connect the second replacement front wall to the back wall.

A top panel can be reversibly connected, being nestled between the vertical connectors of an uppermost front wall and an uppermost back wall of the backstop. Such a top panel might use frictional engagement through an interference fitting with the width of the space between the vertical connectors of the uppermost front wall and the uppermost back wall of the backstop. Similarly, sidewalls might be releasably secured along the sides of the backstop.

DETAILED DESCRIPTION OF THE INVENTION

Discussion of the present invention is now provided with reference to the following associated FIGS. 1-16.

First Embodiment—Single Target

Figure 1:
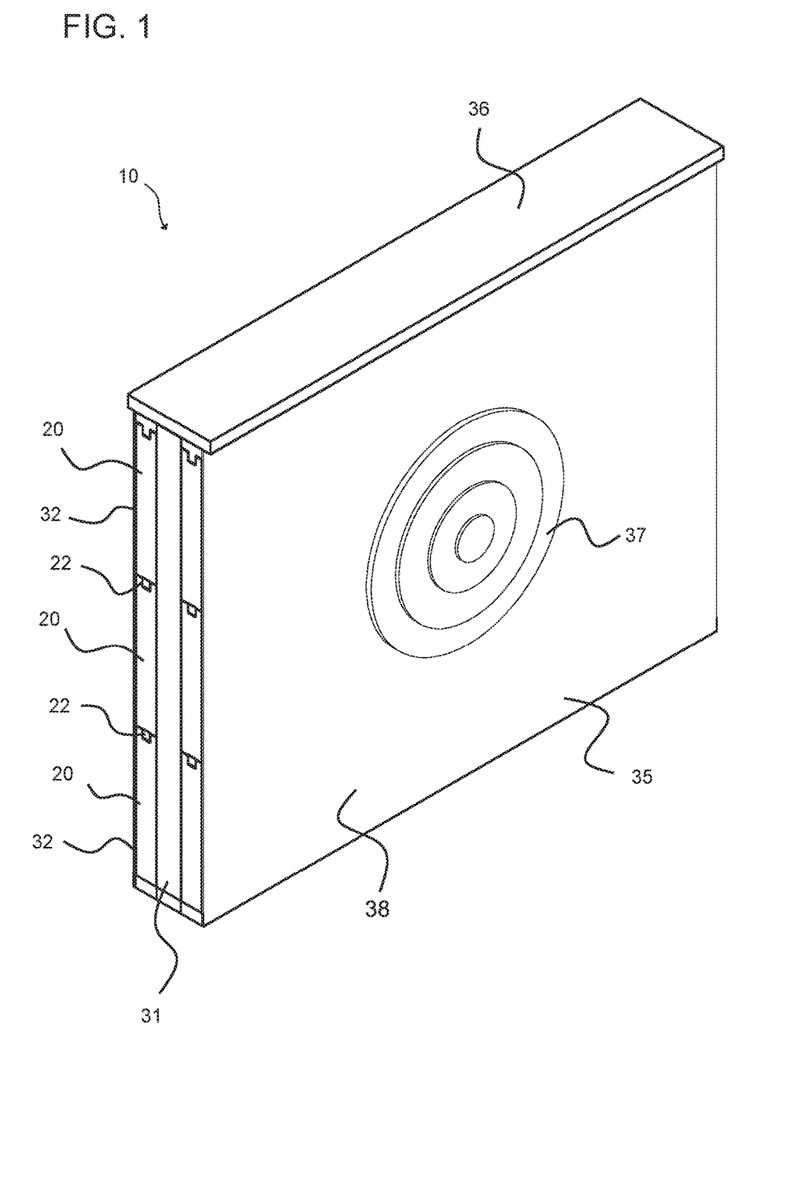
FIG. 1 is a perspective view of one embodiment of a berm of the present invention.

FIG. 1 shows a perspective view of a modular shooting backstop berm 10 for firearms according to the present invention. The bullet catch system 10 shown in FIG. 1 has three blocks 20 having an extended length sidewall 31 extending vertically between the front and back walls of each individual block 20. Each of the blocks 20 are sandwiched between a back wall 32, front wall 35, top wall 36, and base wall 30. The front wall may have a target 37 integrally affixed or attachable. The front wall 35 may also have a patterned design 38 with desired camouflage or artistic setting on the forward-facing surface.

Figure 1A:
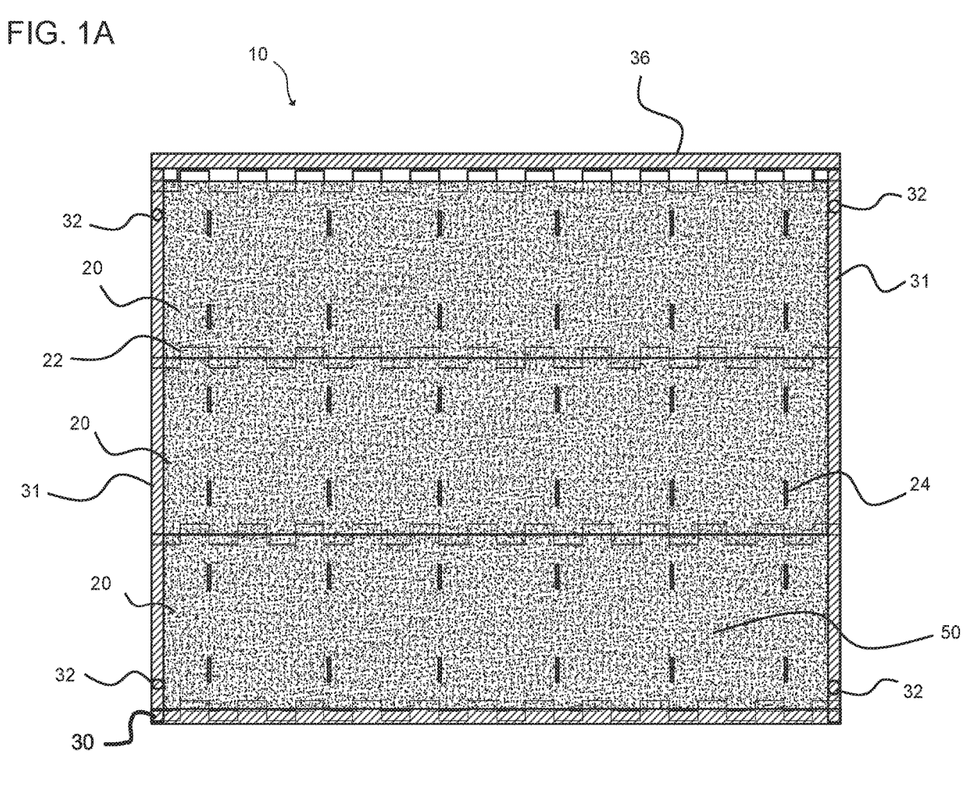
FIG. 1A is a front cross-sectional view of berm of FIG. 1.

FIG. 1A provides a cross-sectional front view of the berm system 10 from FIG. 1, and illustrates the internal aspects thereof which are discussed in greater detail with respect to FIGS. 2-5. As shown in FIG. 1A, the blocks 20 have vertically interlocking connections 22 which enable the block components to fit together without distortion or loss of integrity. Also shown, the top wall 36, side walls 31, and base support 30 are designed to interact with and encompass the blocks to prevent loss of the internal sand substrate 50. Also visible here is the plastic webbing system 24 which connects the front and back walls of each block and provides additional internal vertical support for the internal sand substrate 50.

Generally, these components are releasably and frictionally connected to one another so that they may be easily replaced. However, other embodiments employ pins, bolts, and adhesives to bind the components and provide greater structural support as necessary.

Straight Block 20

FIGS. 2-5 provide various views of a block 20 as used in FIG. 1. As shown here, the straight block has webbing system 24 having nine (9) strong full-length injection molded plastic ties made from polypropylene (PP) regrind resin. These webbing ties 24 secure the two pieces of 1.5 pcf density modified expanded polystyrene (EPS) foam together that makes up each block 20. The blocks 20 are stacked tightly together and inter-locked top to bottom to the desired wall height.

Figure 2:
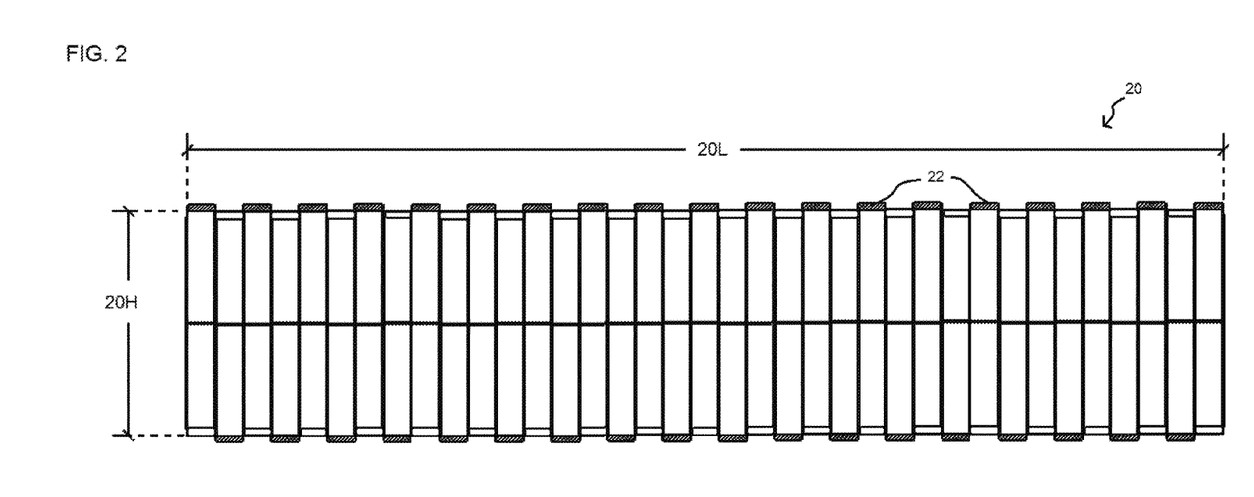
FIG. 2 is a front planar view of a block in the berm showed in FIG. 1.
Figure 3:
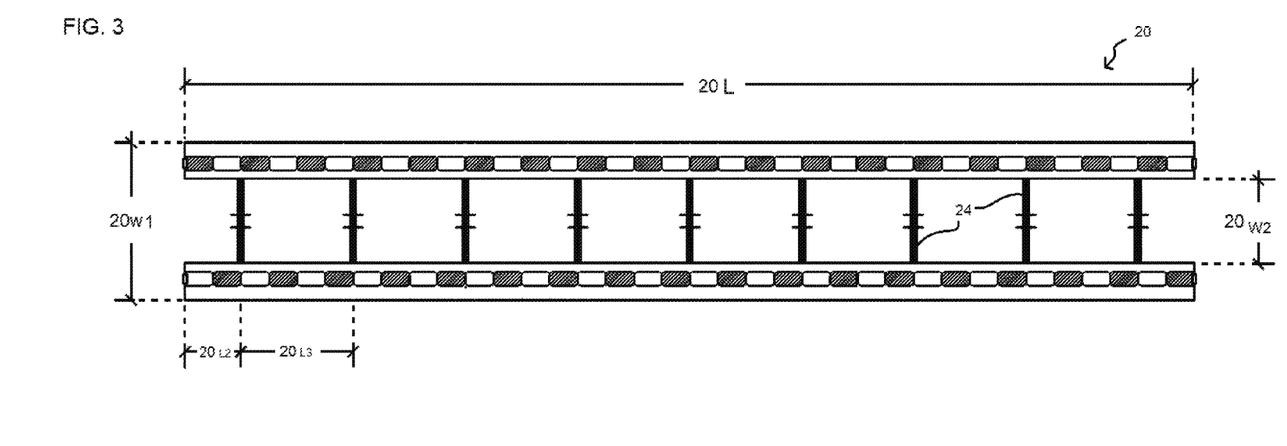
FIG. 3 is a top view of the block showed in FIG. 2.

FIG. 2 shows a front view of the straight block 20. The length 20L between a first end and a second end is 6 feet, or 1,828.80 mm. The height 20H of the main wall portion is 1 ft, 4 in., or 406.40 mm. FIG. 3 shows a top view of the straight block 20. The width 20W1 from the outside of each of the main wall portions is 11¼ in, or 285.75 mm. The width 20W2 from the inside of each of the main wall portions is 6 in, or 152.4 mm. The length 20L2 between a first end and an adjacent bracket is 4 in, or 101.60 mm. The length 20L3 between a first bracket and a second adjacent bracket is 8 in., or 203.20 mm.

Figure 4:
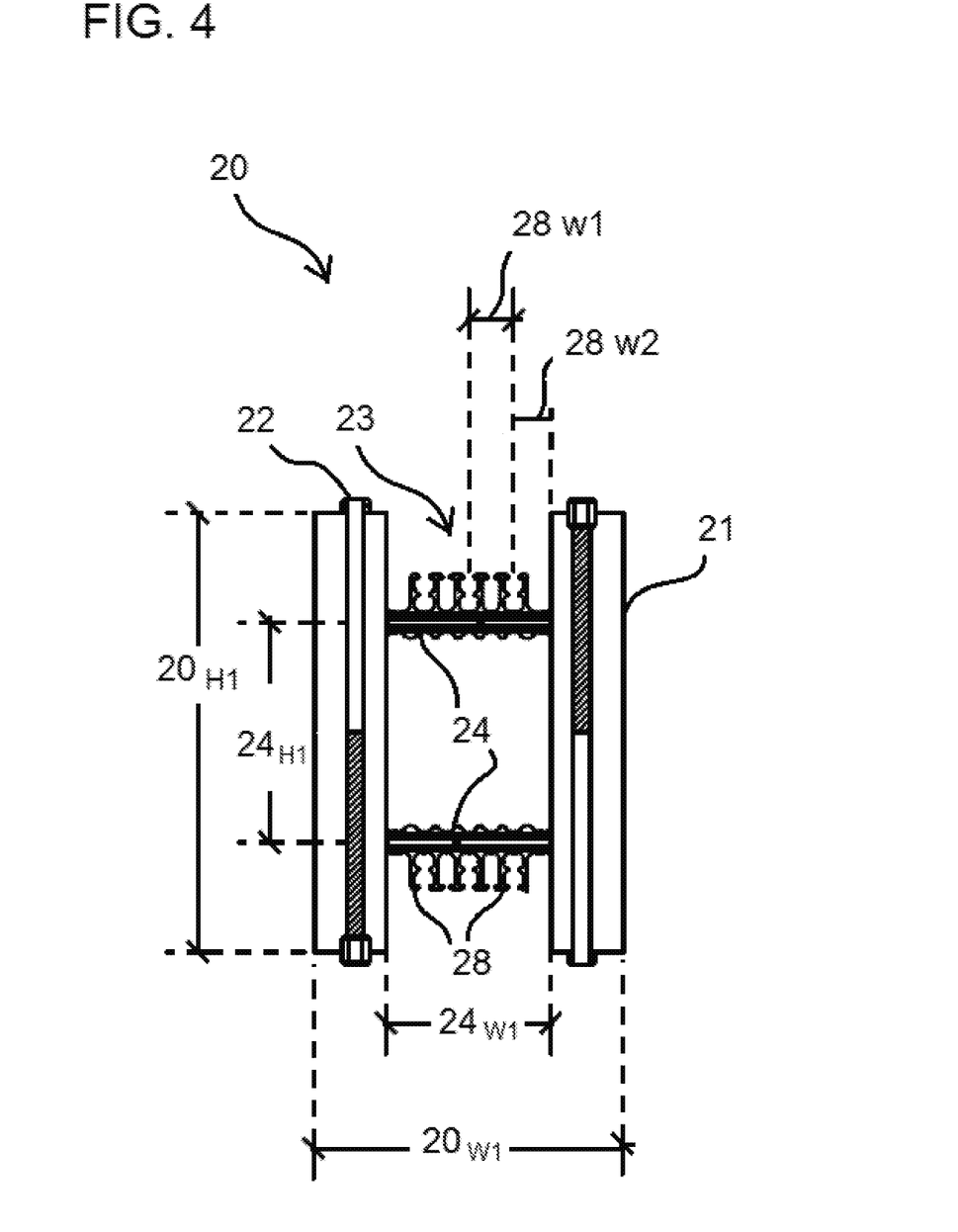
FIG. 4 is side view of the block in FIG. 2.
Figure 5:
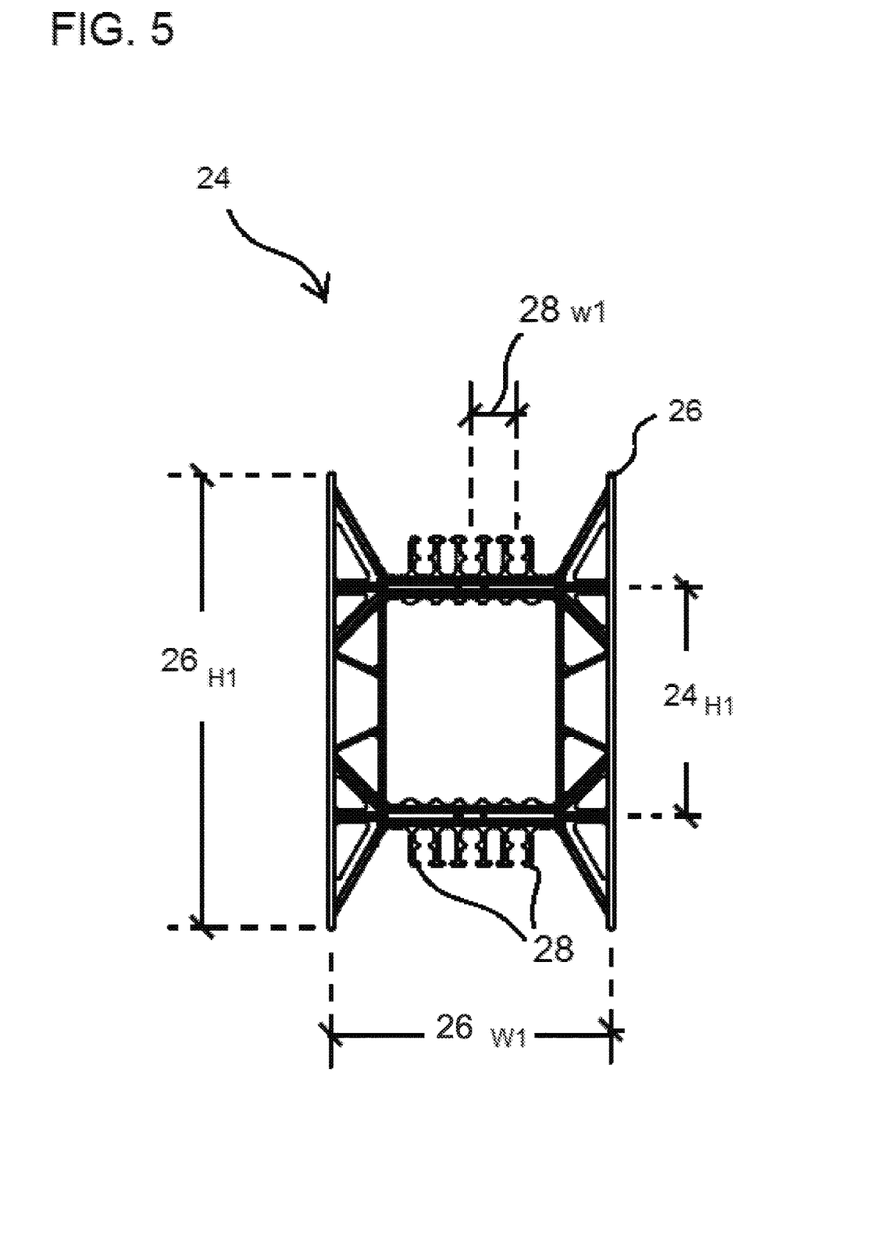
FIG. 5 is a plastic webbing system of the block in FIG. 2.

FIG. 4 shows an end or side view of the straight block 20 with front and back walls 21, vertical interlocking connections 22, webbing system 24, and vertical brackets 28. FIG. 5 shows a plastic webbing system 24 of the block 20 in FIG. 2 with vertical brackets 28. The depth or width distance 28W1 between two brackets 28 along the webbing 24 is typically 1⅝ in, or 41.28 mm. The width or depth distance 28W2 between the adjacent bracket and the wall 21 is typically 1⅜ in, or 34.93 mm. The height 20H1 of the front and back walls 21 is typically 1 ft, 4 in, or 406.40 mm. The height 24H1 between the brackets is typically 8 in, or 203.20 mm. The height 26H1 of the plastic webbing connectors 26 is typically 12 in, but may be in any range of height which is greater than the height 24H1 between the bracket gap and less than the height 20H1 of the walls 21. The width 26W1 between the webbing walls 26 is typically in a range being greater than the width 24W1 of the gap and less than the outermost width 20W1 of the block walls 21.

Multiple Targets

Figure 6:
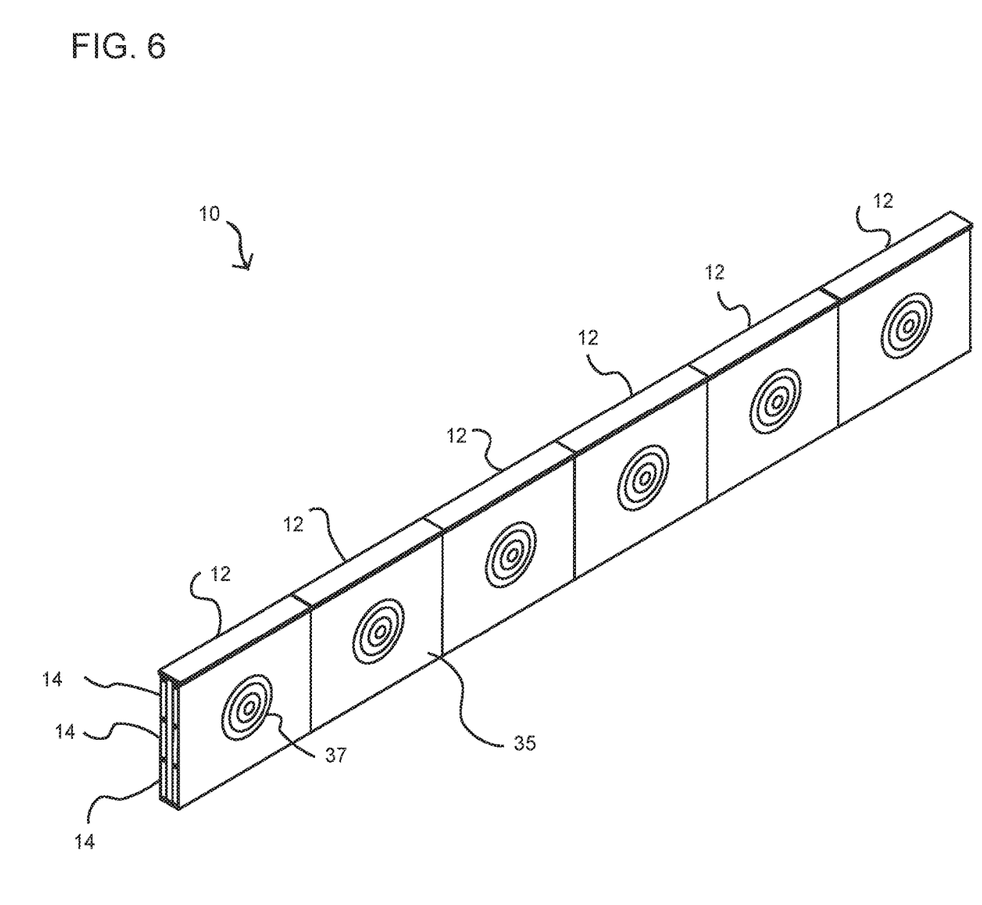
FIG. 6 is a perspective view of one embodiment of a shooting range berm of the present invention.

FIG. 6 is a perspective view of a second embodiment according to the present invention. As shown here, the modular nature of the berm system 10 enables users to design their own layout having multiple rows 14 and columns 12 as desired. In this embodiment, there are six blocks 20 in each row 14, and three blocks 20 in each column 12. The modular nature of the system enables the user to provide a different camouflage 38 on each front 35 and/or to provide tailored targets 37 thereon.

In this embodiment, the blocks 20 in each of the columns 12 are congruent, so that the front panel of each block 20 in each column 12 is horizontally aligned with the respective front panel of each block 20 in an adjacent column 12. Similarly, the blocks 20 in each of the rows 14 are congruent, so that the front panel of each block 20 in each row 14 is vertically aligned with the respective front panel of each block 20 in an adjacent row 14.

Backstop with Angled Sidewall Berms

Figures 7, 8, 9:
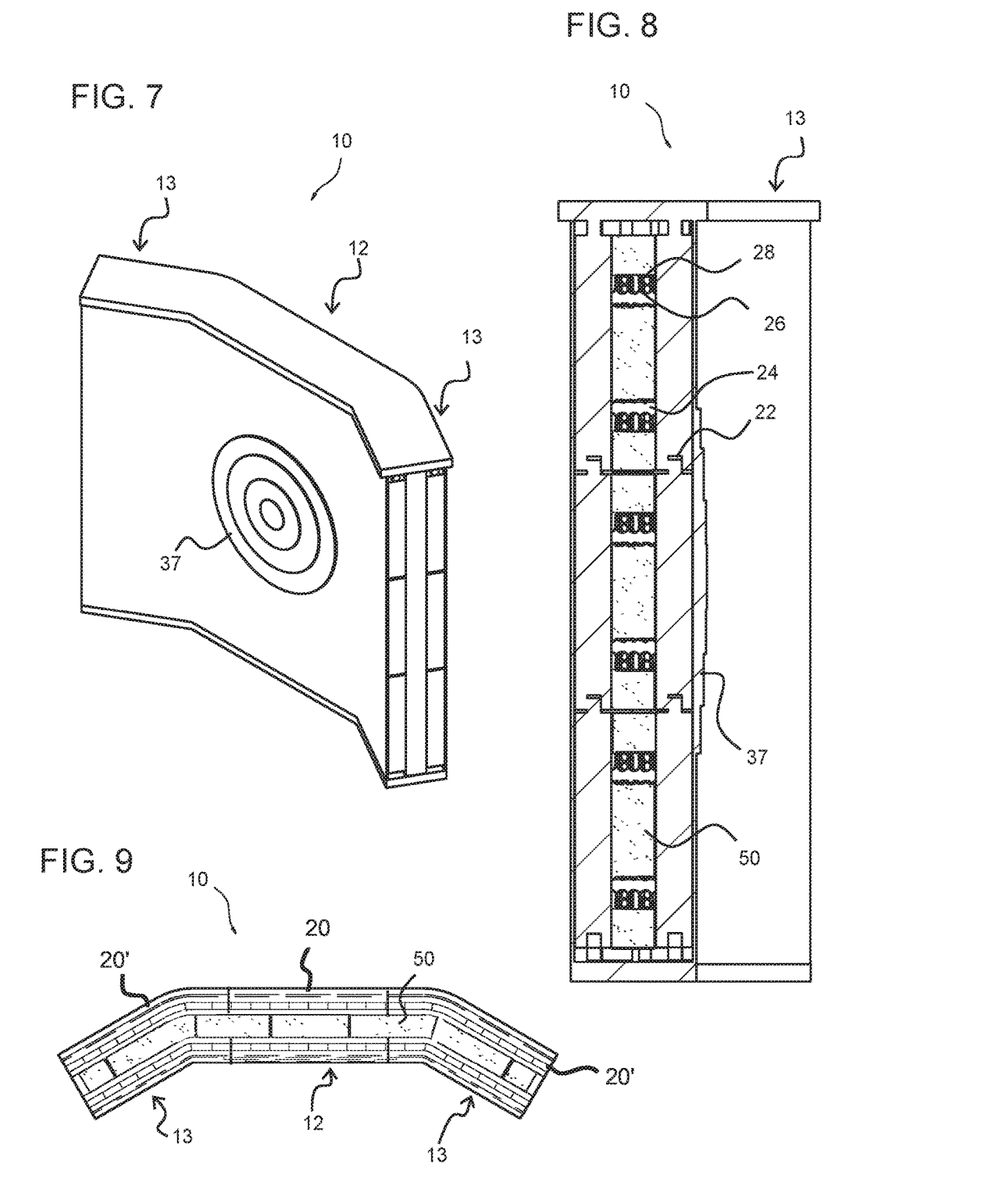
FIG. 7 is a perspective view of one embodiment of a baffle having side berms according to the present invention.
FIG. 8 is a side cross-sectional view of the baffle of FIG. 7.
FIG. 9 is top cross-sectional view of the baffle of FIG. 7.

Shown in FIGS. 7-9 is one embodiment of the present invention having two angled sidewalls 13 extending from either sides of the center main wall 12. FIG. 7 is a perspective view, FIG. 8 is a side cross-sectional view, and FIG. 9 is top cross-sectional view of the baffle 10 having angled sidewall berms 13 according to the present invention. These two angled sidewalls 13 are provided by using two angled blocks 20' on either side of straight center blocks 20.

Figure 10:
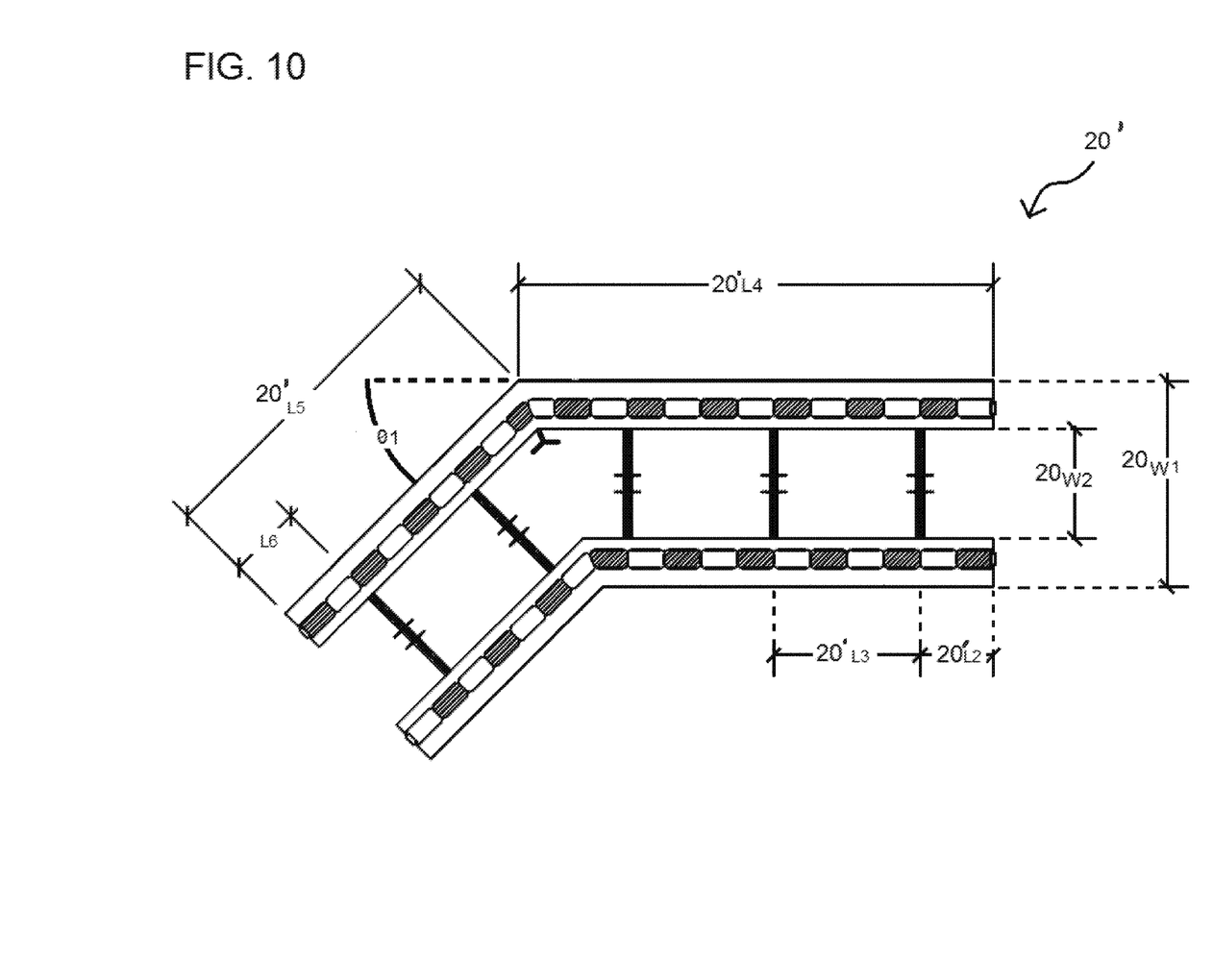
FIG. 10 is a top view of a block of the baffle showed in FIG. 7.

FIG. 10 is a top view of a block of an angled block 20' of the baffle showed in FIG. 7. Specifically, FIG. 10 provides a top view of one block 20' bent at a 45 degree angle θ1. This block 20' has a width 20W1 from the outside of each of the main wall portions which is 11¼ in, or 285.75 mm. The width 20W2 from the inside of each of the main wall portions is 6 in, or 152.4 mm. The length 20'L4 between a first end and a second end is 2 ft 2 in, or 660.40 mm. The length 20'L3 between a first bracket and a second adjacent bracket is 8 in, or 203.20 mm. The length 20'L3 between a first straight end and an adjacent bracket is 4" (101.60 mm). The length 20'L5 between an exterior bend point and a second end is 1'6 in, or 457.20 mm). The length 20'L6 between a second end and an adjacent bracket is 4 in, or 101.60 mm).

In this embodiment, the blocks 20 in each of the adjacent columns 12 are incongruent, so that the front panel of each block 20 in each column 12 is horizontally slanted with respect to a front panel of a block 20 in an adjacent column 12. However, the blocks 20 in each of the rows 14 are still congruent, so that the front panel of each block 20 in each row 14 is vertically aligned with the respective front panel of each block 20 in an adjacent row 14.

Although not shown, it is another object of this invention to provide a system by which at least three columns may be placed perpendicularly to one another, (not simply slanted at an angle). Providing the walls in columns which are perpendicular will create extended sidewall berms for each target area.

Additional Configurations

Figure 11:
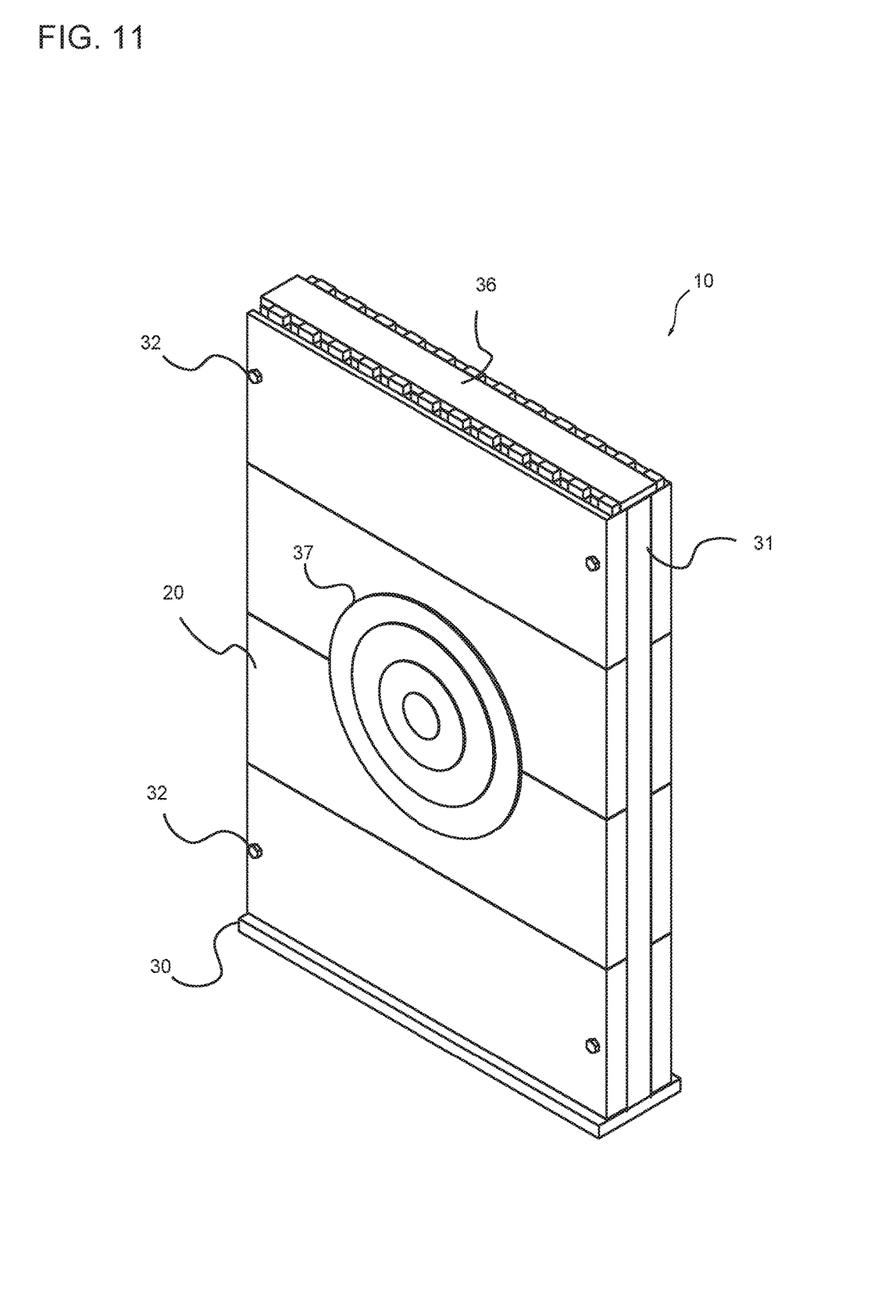
FIG. 11 is perspective view of one embodiment of a berm according to the present invention.

FIG. 11 is perspective view of another embodiment of a berm according to the present invention having reduced components for ease of transport and assembly. In this embodiment, the front cover has been eliminated and the side pins 32 holding the side walls 31 in place with respect to the blocks 20 are visible extending from the front and back for accessibility. The top cover 36 rests between the uppermost vertical interlocking components 22 of the front and back wall of the uppermost block 20. The top cover 36 is not fixedly attached as in other embodiments, instead it rests on portions of the front and back wall, and is held in place only through frictional engagement.

This embodiment preferably has a length between a first end and a second end of between 3 to 7 ft, and more preferably, 4 ft. This embodiment preferably has a total height, from bottom 30 to top 36 of between 5 to 8 ft, and more preferably, 5 ft. The width from the frontmost portion to the backmost portion is between 10 in to 16 in, and more preferably is about 11-13 in.

Figure 12:
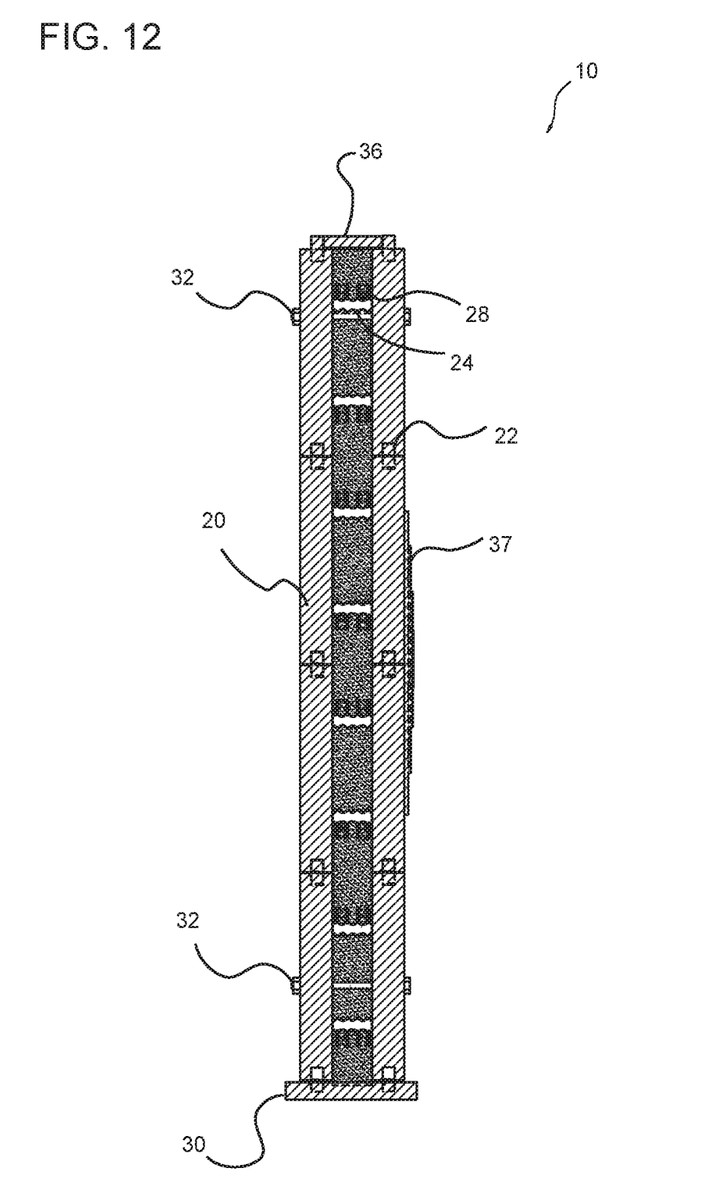
FIG. 12 is a side cross-sectional view of the berm of FIG. 11.

FIG. 12 is a side cross-sectional view of the berm of FIG. 11, illustrating the composite filling between the front and back wall of the berm and the side pins 32 holding the sidewalls 31 in a reversibly locked configuration. Side pins 32 also facilitate a different block type 20" in this embodiment in which the connector 24' is capable of reversibly connecting with the front and back walls of the block 20". This facilitates easy removal of a front panel after destructive usage.

Figure 13:
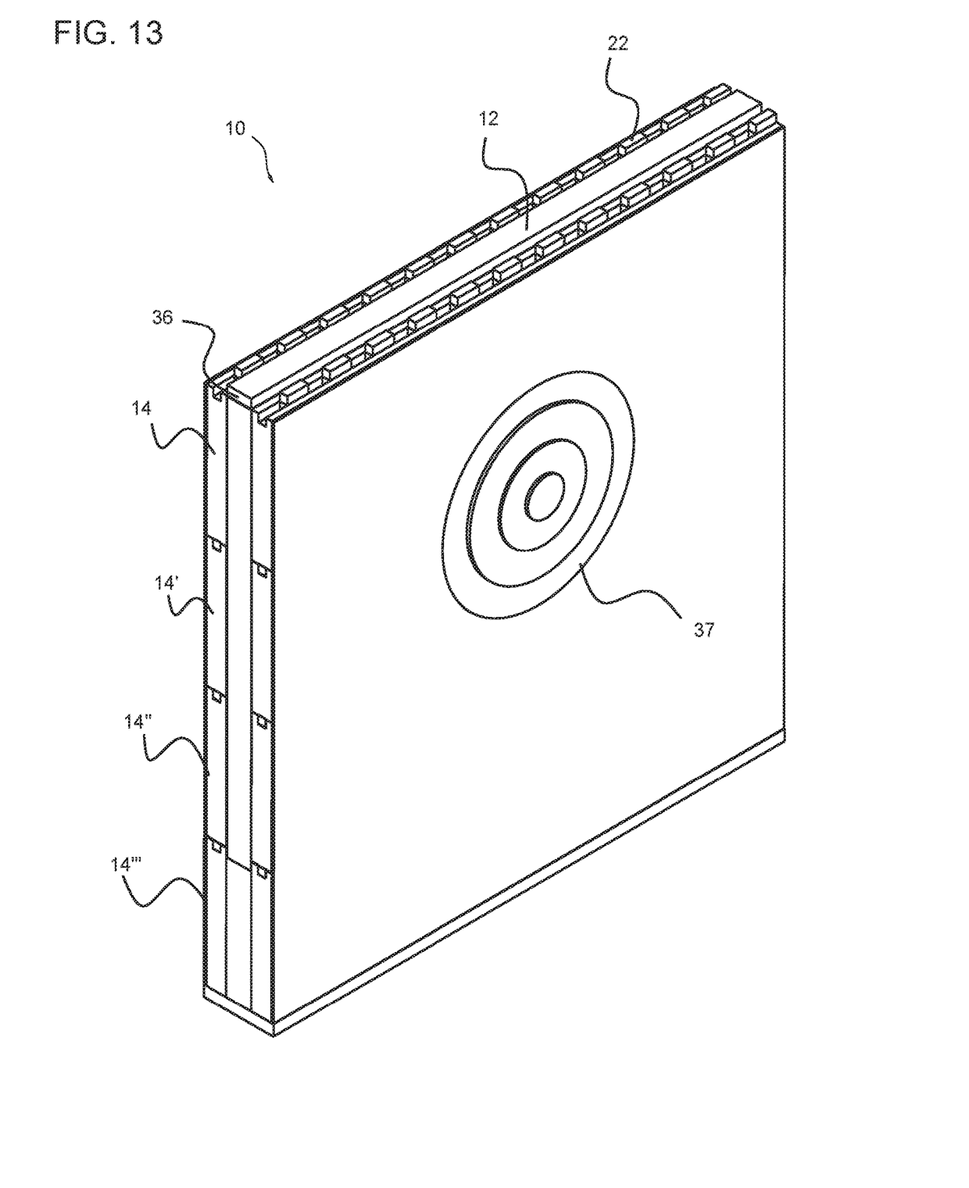
FIG. 13 is a perspective view of another embodiment of a berm according to the present invention.
Figure 14:
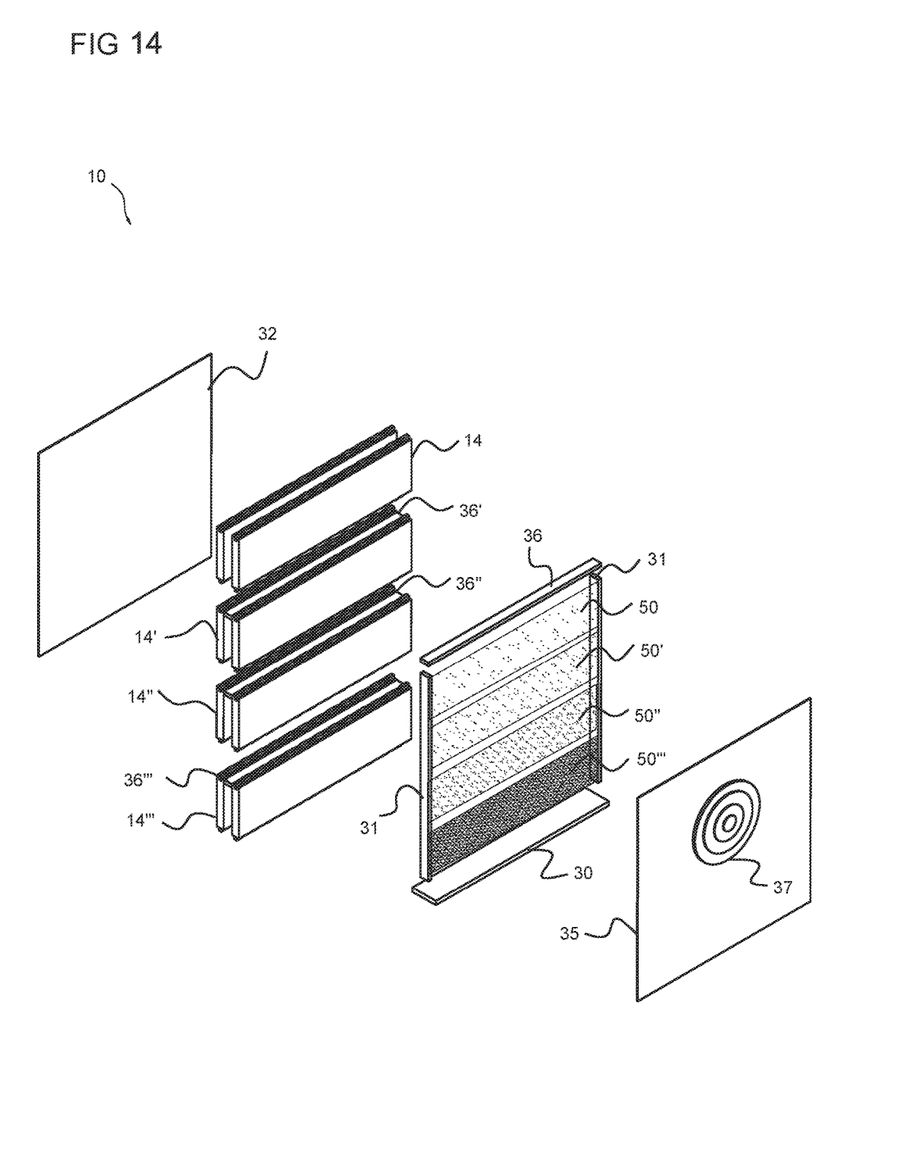
FIG. 14 is an exploded perspective view of the berm of FIG. 13.

FIG. 13 is a perspective view of another embodiment of a berm according to the present invention. FIG. 14 is an exploded perspective view of the berm of FIG. 13, illustrating the use of different composite layers 50, 50', 50", and 50'". In this embodiment, the composite layers 50, 50', 50", and 50'" having different densities from one another are separated by top layers 36', 36", and 36'" which are nested and supported by the front and back walls of the blocks 20 of each respective layer 14, 14', 14", and 14'".

The composite layers 50, 50', 50", and 50'" having different densities, being made of various types of sand. Generally, the composite layer 50 is a granular material composed of finely divided rock and mineral particles, defined by size, being finer than gravel and coarser than silt. Composite layer 50 is usually comprised of sand of a textural class of soil or soil type; i.e., a soil containing more than 85 percent sand-sized particles by mass.

The composition of composite layers 50, 50', 50", and 50'" shown here varies. Where composite layer 50 has silica (silicon dioxide, or $SiO_2$), usually in the form of quartz. The second composite 50' has calcium carbonate, for example, aragonite. The third composite 50" is construction aggregate that has been manufactured from the surplus material (crusher dust) that results when coarse aggregate is produced in hard rock quarries.

Testing Results

Figure 15:
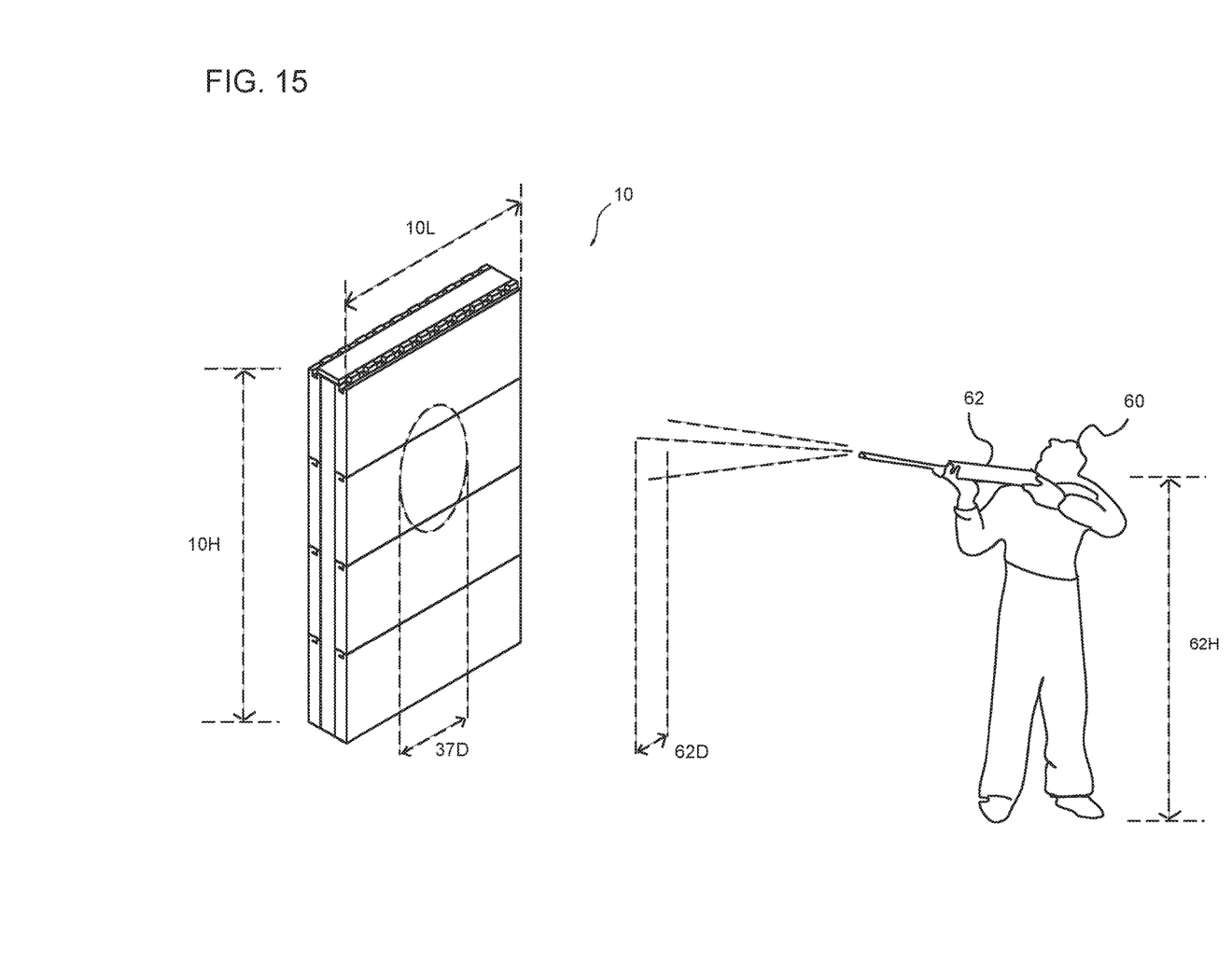
FIG. 15 is a perspective illustration of a backstop according to the present invention during testing.

FIG. 15 illustrates a personalized firearm backstop 10 in use during testing. Effective testing for this invention was performed using firearms 62 including small Arms calipers including: .22, 9 mm 45 Cal, 0.223/5.56, 0.308, and shot gun rounds. During this testing, no rounds penetrated through the back of the backstop 10. During testing, five hundred rounds were fired in an area 37 having a diameter 37D of only three inches.

The tested backstop 10 employed expanded polystyrene "EPS" blocks 20 and panels 36, 31 holding an inner sand substrate 50. The EPS expanded after initial rounds, maintaining structure, and did not weaken in its effectiveness in stopping the rounds. The testing illustrated the concepts of the invention admirably proving that the substrate 50 stops the projectile and contains the projectile 62 until the structure 10 is opened up releasing the substrate 50. The structure 57 itself allows for a clean penetration without any deterioration unless repeatedly shot in the same general area 37.

Personalized Backstop Based on Anticipated Usage

Figure 16:
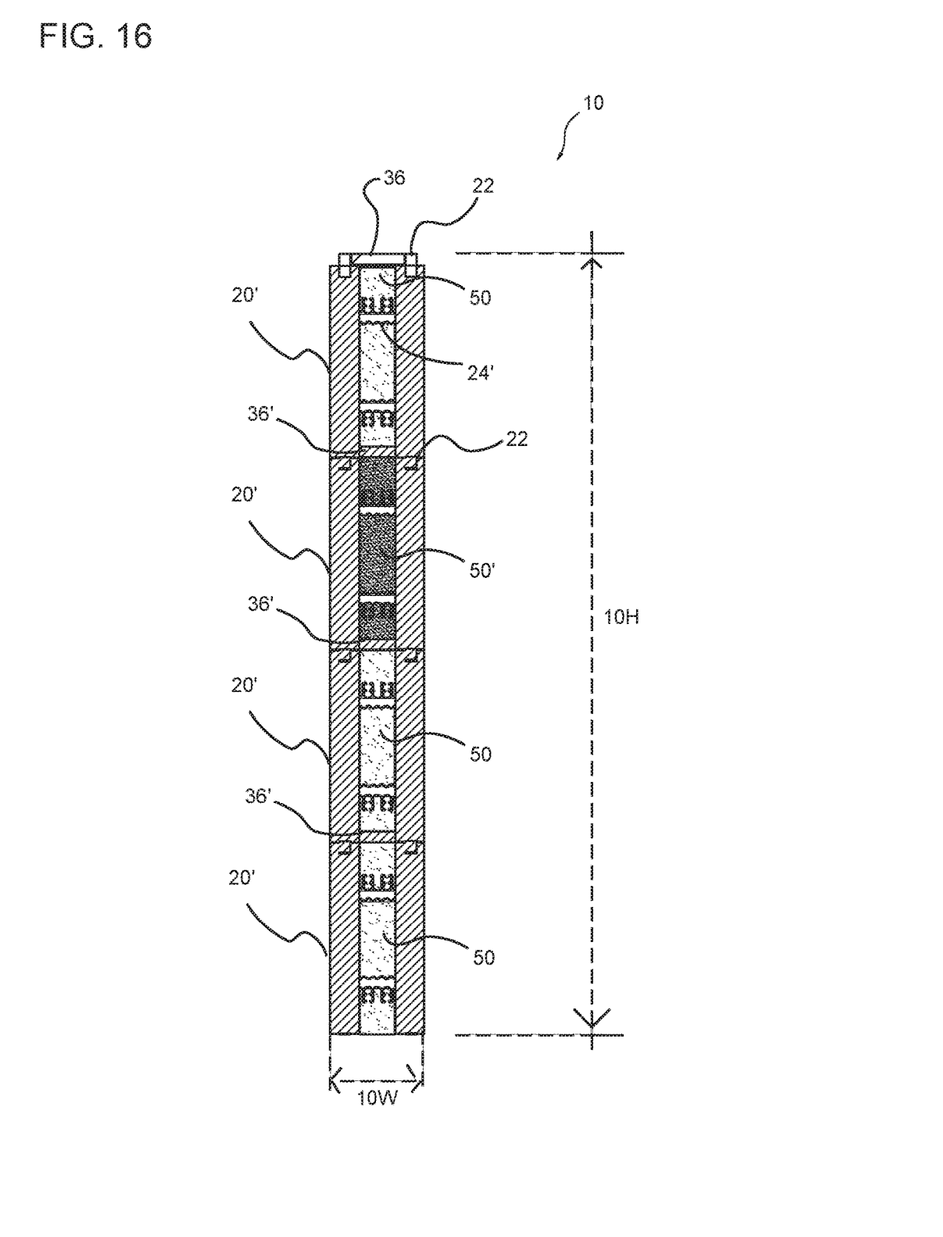
FIG. 16 is a cross-sectional view of a backstop of the present invention.

FIG. 16 illustrates a cross-sectional view of a backstop 10 which seeks to provide tailored backstops for users 60 anticipating greater projectile 62 usage. Specifically, one row 14 of blocks 20 has a substrate 50' which has a greater density than the substrate 50 in block rows 14 which are exposed to less intensive projectile usage, i.e., greater than 94 lb/ft$^3$, providing greater support and increased durability. The discussion of this embodiment includes reference to elements which are not all illustrated in FIG. 16, but instead are discussed with respect to FIG. 15, above.

Specifically, for the embodiment shown in FIG. 16, a ratio of the height of the projectile 62H to the height of the backstop 10H was used to determine which block row 14 will experience the most projectile force. The ratio of the projectile scatter pattern diameter 62D to the target diameter 37D was also used to determine the preferred overall length of the backstop 10L. The preferred projectile 62 was used to determine the preferred thickness or width of the backstop 10W.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

REFERENCE NUMBERS

The following reference numbers are adhered to within the drawings:
10 Bullet catch system: berms, baffles, and/or backstops
10W Backstop width
10H Backstop height
10L Backstop length
12 Columns
14 Rows
20 Block
20W Block width
20H Block height
20L Block length
21 Block sidewalls
22 Block vertically interlocking connections
23 Block Intermediate gap
24 Block plastic webbing system connecting the front and back
26 Block plastic webbing system portions connectors
28 Block Plastic webbing system vertical clamps
30 Base
31 Side walls
32 Lateral connectors
33 Clips
34 Back
35 Front
36 Top
37 Target
38 Camouflage
40 Longitudinal connectors
47 Vertical connectors
48 Horizontal back brace
50 Center sand substrate
60 User
62 Projectile source path
62D Projectile path diameter
62H Projectile source Height

What is claimed is:

1. A personalized backstop, the personalized backstop comprising a modular system capable of reversible construction, the modular system comprising:
 a plurality of blocks, each of said plurality of blocks having:
  a front wall and a back wall interconnected by interior webbing, defining a space between the front wall and the back wall; and
  a plurality of vertical interlocking connectors, the plurality of vertical interlocking connectors of a first block of said plurality of blocks capable of reversibly interlocking with the plurality of vertical interlocking connectors of a second block of said plurality of blocks;
 at least two side walls, wherein the plurality of blocks are sandwiched between the at least two sidewalls, defining horizontal boundaries of the space between the front walls and the back walls of the plurality of blocks;
 a top panel and a bottom, wherein the plurality of blocks are sandwiched between the top panel and the bottom, defining vertical boundaries of the space between the front and back walls of the plurality of blocks; and
 a composite material; wherein the composite material filling the space between the front walls, the back walls, the at least two sidewalls, the top panel, and the bottom of the backstop.

2. The personalized backstop of claim 1, further comprising at least three columns, the plurality of blocks in each of the at least three columns being congruent; and at least three rows, the plurality of blocks in each of the at least three rows being congruent.

3. The personalized backstop of claim 2, wherein the at least three columns are aligned vertically congruent and adjacent one another.

4. The personalized backstop of claim 2, wherein the at least three columns are aligned vertically incongruent and yet adjacent one another, such that a first column is slanted with respect to an adjacent second column, and the second column is slanted with respect to an adjacent third column.

5. The personalized backstop of claim 1, wherein at least a first front wall of each of the plurality of blocks is reversibly connected by the interior webbing to the respective back wall of each of the plurality of blocks; such that the first front wall of each of the plurality of blocks is removable and replaceable by a second front wall; and the second front wall is then reversibly connectable by the interior webbing to the respective back wall of each of the plurality of blocks.

6. The personalized backstop of claim 1, wherein the top panel rests upon an uppermost portion of the plurality of blocks, being securely fastened thereto.

7. The personalized backstop of claim 1, wherein the top panel is nestled between the vertical connectors of an uppermost front wall and an uppermost back wall of the plurality of blocks, being releasably connected thereto.

8. The personalized backstop of claim 1, wherein the composite material is comprised of at least one of silica, silicon dioxide, quartz, calcium carbonate, aragonite, and construction aggregate.

* * * * *